US011953042B1

(12) United States Patent
Jaime et al.

(10) Patent No.: US 11,953,042 B1
(45) Date of Patent: Apr. 9, 2024

(54) SPLINE JOINTS AND SPLINE JOINT INSTALLATION METHODS

(71) Applicant: Roscoe Moss Manufacturing Company, Los Angeles, CA (US)

(72) Inventors: Oscar M. Jaime, Los Angeles, CA (US); Craig Logan, Los Angeles, CA (US)

(73) Assignee: ROSCOE MOSS MANUFACTURING COMPANY, Los Angeles, CA (US)

(*) Notice: Subject to any disclaimer, the term of this patent is extended or adjusted under 35 U.S.C. 154(b) by 189 days.

(21) Appl. No.: 17/545,100

(22) Filed: Dec. 8, 2021

Related U.S. Application Data

(60) Provisional application No. 63/122,806, filed on Dec. 8, 2020.

(51) Int. Cl.
*F16B 3/04* (2006.01)
*F16D 1/116* (2006.01)

(52) U.S. Cl.
CPC ............... *F16B 3/04* (2013.01); *F16D 1/116* (2013.01); *Y10S 403/14* (2013.01)

(58) Field of Classification Search
CPC .......... F16B 3/04; F16B 21/073; F16B 21/08; F16B 21/18; F16B 21/183; F16B 21/186; F16D 1/108; F16D 1/116; F16D 2001/103; F16L 37/148; Y10S 403/14; Y10T 403/587; Y10T 403/60; Y10T 403/70105; Y10T 403/7018; Y10T 403/7047; Y10T 403/7061; Y10T 403/7073; Y10T 403/7075
USPC ....... 403/319, 326, 353, 355, 365, 372, 375, 403/376, DIG. 14; 285/321, 336; 220/319
See application file for complete search history.

(56) References Cited

U.S. PATENT DOCUMENTS

| 4,496,071 A * | 1/1985 | Stewart | F16B 3/04 215/273 |
| 4,498,874 A * | 2/1985 | Pichl | F16B 3/04 285/305 |
| 5,014,871 A * | 5/1991 | Mutter | F16B 3/04 292/256.63 |
| 9,441,651 B2 * | 9/2016 | James | F16B 3/04 |
| 9,810,322 B2 * | 11/2017 | Bueter | F16B 3/04 |

(Continued)

FOREIGN PATENT DOCUMENTS

| CH | 381483 A * | 8/1964 | ............ F16L 37/148 |
| CH | 476219 A * | 7/1969 | ............ F16L 37/148 |

(Continued)

*Primary Examiner* — Josh Skroupa
(74) *Attorney, Agent, or Firm* — SNELL & WILMER LLP

(57) ABSTRACT

Spline joints and methods of installing the same. A spline joint may include a box and a pin each having a hollow cylindrical body. The pin may be received by the box. The spline joint may further include splines received by a first set of grooves of the box and grooves of the pin. The splines may be insertable between the first set of grooves through a first set of slots of the box to join the box and the pin. The spline joint may further include at least one O-ring to be received by a second set of grooves of the box to create a seal between the box and the pin. The spline joint may further include a key configured to be received by a second slot of the box and installed in a slot of the pin.

20 Claims, 10 Drawing Sheets

(56) References Cited

U.S. PATENT DOCUMENTS

2013/0081404 A1 * 4/2013 Baldischweiler ......... F16B 3/00
  403/335
2020/0321729 A1 * 10/2020 Schlegel ............... F16B 21/073

FOREIGN PATENT DOCUMENTS

| DE | 2339001 A1 | * | 2/1974 | ................ F16B 3/04 |
|----|------------|---|--------|---------------------------|
| DE | 2811375 A1 | * | 9/1979 | ................ F16B 3/04 |
| DE | 202017005706 U1 | * | 5/2018 | ............ F16L 37/148 |
| EP | 0225305 A1 | * | 6/1987 | ............ F16L 37/148 |
| EP | 0438296 A2 | * | 7/1991 | ................ F16B 3/04 |
| EP | 3205893 B1 | * | 1/2020 | ................ F16B 3/04 |
| FR | 1009812 A | * | 6/1952 | ................ F16B 3/04 |
| GB | 2080901 A | * | 2/1982 | ................ F16B 3/04 |
| GB | 2253459 A | * | 9/1992 | .......... F15B 15/1438 |
| PT | 90445 B | * | 5/1994 | ............ F16L 37/148 |

* cited by examiner

SPLINE JOINTS AND SPLINE JOINT INSTALLATION METHODS

CROSS-REFERENCE TO RELATED APPLICATIONS

This application claims priority to and the benefit of U.S. Provisional Patent Application No. 63/122,806, titled "SPLINE FITTINGS," filed on Dec. 8, 2020, and the entirety of which is hereby incorporated by reference herein.

BACKGROUND

1. Field

The various aspects and embodiments described herein relate to mechanical joint systems, more particularly, to spline joints and methods for installing the same.

2. Description of the Related Art

There are different ways to join pipes together. Many of these techniques require significant time or risk damage to the pipes. For instance, pipes may be threaded; however, threaded pipes must be differentially rotated during assembly and disassembly, requiring additional tooling, or risking galling of the threads. In further instances, pipes may be welded. However, regulatory requirements may limit the availability of welding of certain materials without strict control of generated fumes, or the location of the project at hand may prohibit the use of an open ignition source, as in a welding arc, due to the presence of flammable gases. In yet further instances, spline joints or fittings facilitate joining of pipes more rapidly and with less required skill or tooling; however, various challenges remain. Generally, spline joints or fittings (also known as ZSM fittings) provide a mechanical joint system for pipes where a spline is inserted through a machined groove around a pipe. A pin portion of a spline joint passes into a box portion of a spline joint. However, during this insertion, an O-ring disposed on the pin portion may be damaged. Moreover, while spline joints are able to withstand large tensile loads along a longitudinal axis of the joined pipes, rotation may occur between the box and pin aspect of the spline joint under relatively lesser torsional loads, causing differential rotation of two pipes joined by a spline joint. Means to counteract these torsional loads must be provided. Various other challenges exist, which will be discussed herein. Consequently, there remains a need for a spline joint with improved structures and features.

SUMMARY

Spline joints and methods of installing the same are disclosed herein. A spline joint may include a box and a pin each having a hollow cylindrical body. The box and the pin may be joined by fully inserting the pin into the box as permitted by its design. The box and the pin may have special "V" profiled spline grooves where splines may be inserted. The splines may be inserted through spline slots on the box to secure the pin to the box. The spline joint may further include at least one O-ring to be received by square profiled grooves of the box, and optionally in the pin, to create a seal between the box and the pin. The spline joint may further include a key configured to be received by a key slot of the box, with the key factory installed on the pin or in a key slot of the pin to prevent rotation of the pin and the box relative to each other.

In one aspect, the disclosure is embodied in a spline joint to be used in a system having a casing or a screen. The spline joint may include a box. The box may have a hollow cylindrical body. The body may have an inner surface and a distal end. The distal end may have an arcuate shoulder extending into the body. The inner surface may have a plurality of grooves and a plurality of slots. The spline joint may further include a pin. The pin may be configured to be received by the box. The pin may have a hollow cylindrical body. The body may have an outer surface and a distal end. The distal end may have an arcuate shoulder extending away from the outer surface. The outer surface may have a plurality of grooves and a slot. The spline joint may further include a plurality of splines. The splines may be configured to be received by a first set of grooves of the plurality of grooves of the box and the plurality of grooves of the pin. The plurality of splines may be insertable between the first set of grooves of the box and the first set of opposing grooves of the pin through a first set of slots of the plurality of slots of the box to join the box and the pin. The spline joint may further include at least one O-ring. The O-ring may be configured to be received by a second set of grooves of the plurality of grooves of the box to create a seal between the box and the pin. The spline joint may further include a key configured to be received by a second slot of the plurality of slots of the box and factory installed in a slot or the shoulder of the pin to prevent rotation of the pin and the box relative to each other.

In another aspect, the disclosure is embodied in a spline joint configured to be used in a system having a column pump. The spline joint may include a box. The box may have a hollow cylindrical body. The body may have an inner surface and a distal end. The distal end may have an arcuate shoulder extending into the body. The inner surface may have a plurality of grooves and a plurality of slots. The spline joint may further include a pin. The pin may be configured to be received by the box. The pin may have a hollow cylindrical body. The body may have an outer surface and a distal end. The distal end may have an arcuate shoulder extending away from the outer surface. The outer surface may have a plurality of grooves and a slot. The spline joint may further include a plurality of splines. The splines may be configured to be received by a first set of grooves of the plurality of grooves of the box and the plurality of grooves of the pin. The plurality of splines may be insertable between the first set of grooves of the box and the first set of opposing grooves of the pin through a first set of slots of the plurality of slots of the box to join the box and the pin. The spline joint may further include a plurality of O-rings. The O-ring may be configured to be received by a second set of grooves of the plurality of grooves of the pin to create a seal between the box and the pin. The spline joint may further include a key configured to be received by a second slot of the plurality of slots of the box and factory installed in a slot or the shoulder of the pin to prevent rotation of the pin and the box relative to each other.

In yet another aspect, the disclosure is embodied in a method for installing a spline joint. The method may include lifting a first pipe or screen from a shoulder formed at a joint between the first pipe or screen and a first box attached to an end of the first pipe or screen. The method may further include setting the first pipe or screen on a surface such that the first box is facing away from the surface. The method may further include inserting at least one O-ring in a first circumferential groove formed on an interior surface of the first box. The method may further require lubricating the O-ring and the interior surface of the box. The method may further include lifting a second pipe or screen from a shoulder formed at a joint between the second pipe or screen and a second box attached to a first end of the second pipe or screen. The method may further include aligning a key slot on the first box with a key installed on a pin attached to a second end of the second pipe or screen. Once key and key slot are aligned, the method may further include setting the second pipe or screen over the first pipe or screen such that the pin is inserted into the first box. The method may further include lubricating an end of a first spline and a second spline. The method may further include inserting each of the first spline and the second spline from the lubricated end through a spline slot until the lubricated end is visible through the spline slot again.

BRIEF DESCRIPTION OF THE DRAWINGS

Other apparatus, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Figure 1:
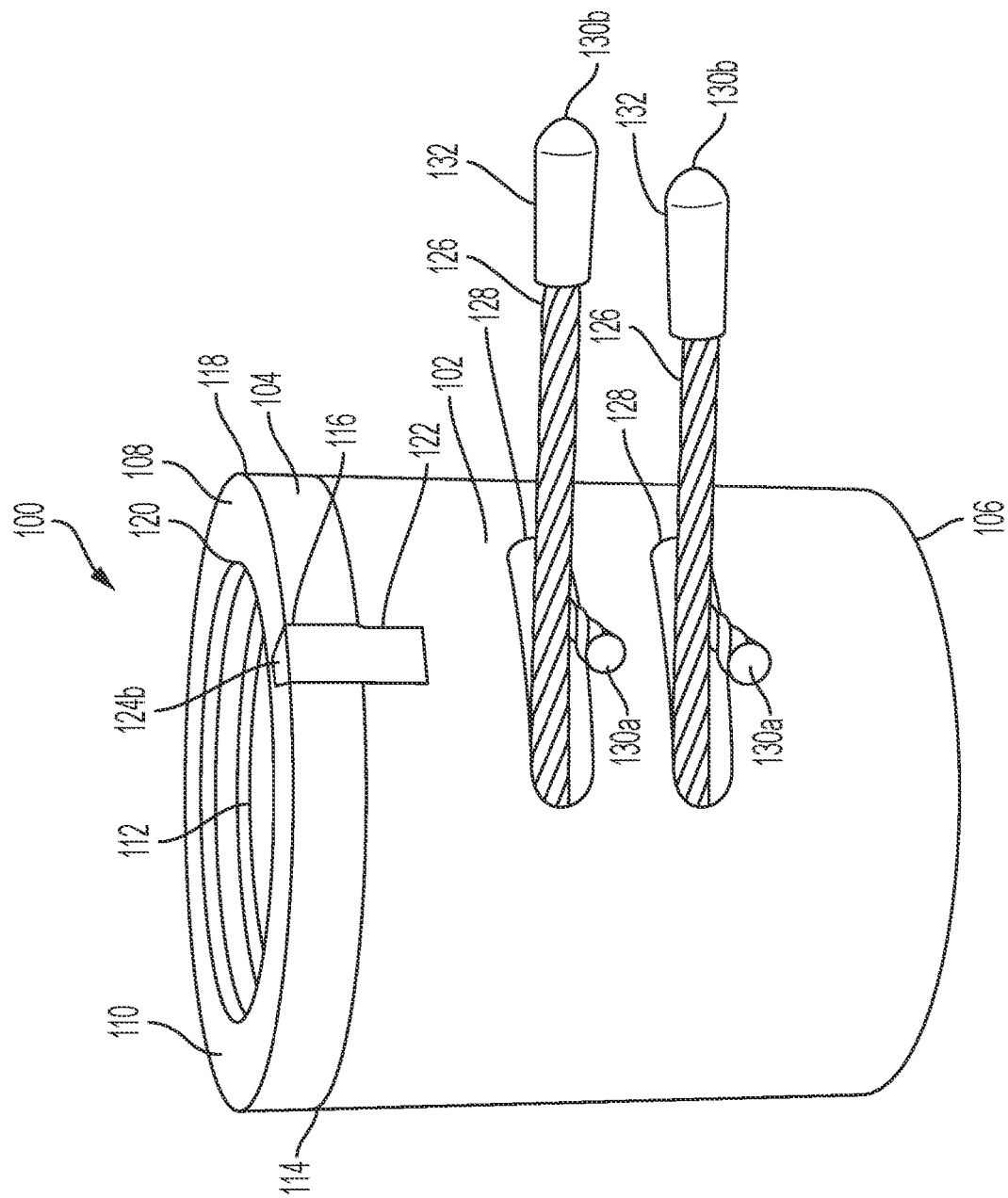
FIG. 1 illustrates a perspective view of a spline joint according to an aspect of the present disclosure.

Generally, spline joints or fittings provide a mechanical joint system for pipes where a spline or splines are inserted through a machined groove around a pipe. The grooves and splines establish an interference fit, and in various instances, the grooves are sized and specially shaped to compress the splines without shearing them. This locks the splines within the grooves even while the joint endures large tensile loads. Spline joints often eliminate the need for special skills or tooling for installation. Spline joints may be adapted to join steel, stainless steel, and other specialty steel pipes. In some instances, regulatory or safety requirements may prohibit welding in general, or welding of stainless steel or other specialty steels where fumes are emitted in an uncontrolled manner during the process.

Spline joints are easy and quick to assemble and disassemble. Further, spline joints yield a strong tensile bearing connection. The connection is sealed and capable of withstanding pressures both internally and externally. Spline joints may feature a key that prevents rotation of the joined parts by allowing the connection to withstand applied torques or rotational forces. Rotational forces are particularly common where spline joints are used with pump columns. Spline joints in pump column applications provide durability and resist galling of the materials used in the spline joint or the joint geometry.

The spline joints and methods of installing the same described herein enable joining pipes or screens. The spline joints may be used in water well casing and screen applications as well as pump column or riser pipe applications. A spline joint may include a box and a pin each having a hollow cylindrical body. The bodies of the box and the pin may each have a uniform outer diameter to prevent debris from accumulating inside the spline joint and to provide a visible shoulder to shoulder plate to ensure proper insertion of the spline joint. The box and the pin may each be coupled to a pipe. For example, the box and the pin may each be welded to a pipe. The box and the pin may advantageously each have an external register allowing for an easy positioning of the pipe with respect to the box or pin for welding. The box and the pin may advantageously each have an internal bevel for a sealing weld at the inner surface of the spline joint and the pipes. The box and the pin may be joined by partially inserting the pin into the box.

The mating surfaces may advantageously have a uniform diameter to allow for consistent clearances and a known plane of interference between coupling mating surfaces and the spline. A proximal end of the pin may be spaced apart from the shoulder of the box when the box and the pin are joined to prevent interference of debris accumulation with installation. A proximal end of the box and the shoulder of the pin may make direct contact with each other when the box and the pin are fully joined to serve as visual confirmation that the connection is fully engaged and was successful. The box and the pin may have spline grooves where splines may be inserted. The splines may be inserted through spline slots on the box to secure the pin to the box. The spline joint may further include at least one O-ring to be received by square grooves of the box to create a seal between the box and the pin. The O-ring grooves advantageously do not interfere with spline grooves during assembly to prevent damage to the O-ring and unseating of the O-ring. The spline joint may further include a key configured to be received by a key slot of the box and a secured on the shoulder or a key slot of the pin to prevent rotation of the pin and the box relative to each other. The spline joint may advantageously eliminate the requirement for having pipe trenches or wells with large diameter for large flange connections. The spline joint may further eliminate the need for threading and rotation of the pipes during installation, thereby eliminating the risk of galling the threads during installation or long after beginning of use. The spline joint may further eliminate the need of welding, welding equipment, consumables, skilled labor, generation of welding fumes, and an open ignition source.

FIG. 1 illustrates a perspective view of a spline joint 100 according to an aspect of the present disclosure. The spline joint 100 may join pipes, well casings, well screens, pump columns, and the like in vertical, slanted, or horizontal applications. The joined parts may be metallic and other materials recognized in the piping industry. For example, the joined parts may be stainless steel or mild steel pipes. The spline joint 100 may include a box 102 and a pin 104. The box 102 and the pin 104 may be hollow and cylindrical. The box 102 and the pin 104 may be made from a metal. The box 102 and the pin 104 may be machined to achieve a desired profile. The box 102 and the pin 104 may each be attached to a part being joined. For example, the box 102 and the pin 104 may each be welded to a pipe end. The box 102 may be attached to the part from a distal end 106 of the box 102. The pin 104 may be attached to the part from a distal end 108 of the pin 104. The box 102 and the pin 104 may have the same inner diameter as the parts that the box 102 and the pin 104 are attached to, respectively, for example, in pump column applications.

The distal end 108 of the pin 104 may have a shoulder 110 extending away from a bore 112 of the pin 104. Said differently, the shoulder 110 may extend outward of an outer surface 162 (see FIG. 4) of the pin 104 in a direction away from a central longitudinal axis 113 (see FIG. 4) of the pin 104. The shoulder 110 may be arcuate. The pin 104 may engage the box 102 such that the shoulder 110 is biased against a proximal end 114 of the box. The shoulder 110 may have a key slot 116. The key slot 116 may partially extend from an outer circumference 118 of the shoulder to the inner circumference 120 of the shoulder. The key slot 116 may conform with the arcuate shape of the shoulder 110. The key slot 116 may have a corresponding key 124b installed and secured at the factory. The key 124b may be aligned with a key slot 122 of the box 102. The key slots 116, 122 may receive the key 124b (see FIG. 10). The key 124b may prevent rotation of the box 102 and the pin 104 relative to each other. Alternatively, key 124a may be installed on the shoulder 110 in the absence of key slot 116 to prevent rotation of the box 102 and the pin 104 relative to each other.

The spline joint 100 may have one or more splines 126. In various embodiments, a plurality of splines 126 are provided. Thus, while FIG. 1 depicts two splines 126, one may appreciate that different numbers of splines 126 may be implemented. The splines 126 may be flexible rods that engage with the box 102 and the pin 104 to couple the box 102 and the pin 104 together. The splines 126 may be made from metal or plastic. For example, the splines 126 may be a cable or a spring made from metal. In another example, the splines 126 may be a series of beads made from plastic or metal. A cable is shown in FIG. 1 by example. The splines 126 may extend out of slots 128 on the box 102 from either or both ends 130a,b. The slots 128 may have an obround shape as shown in FIG. 1. In other examples, the slots 128 may be rectangular, elliptical, or any other elongated shape. One or both ends 130a,b may have a cover 132. The cover 132 may be plastic or metal. The cover 132 may prevent one from getting poked or scratched by the ends 130a,b. In FIG. 1, only spline ends 130b have the cover 132 by example.

Figure 2:
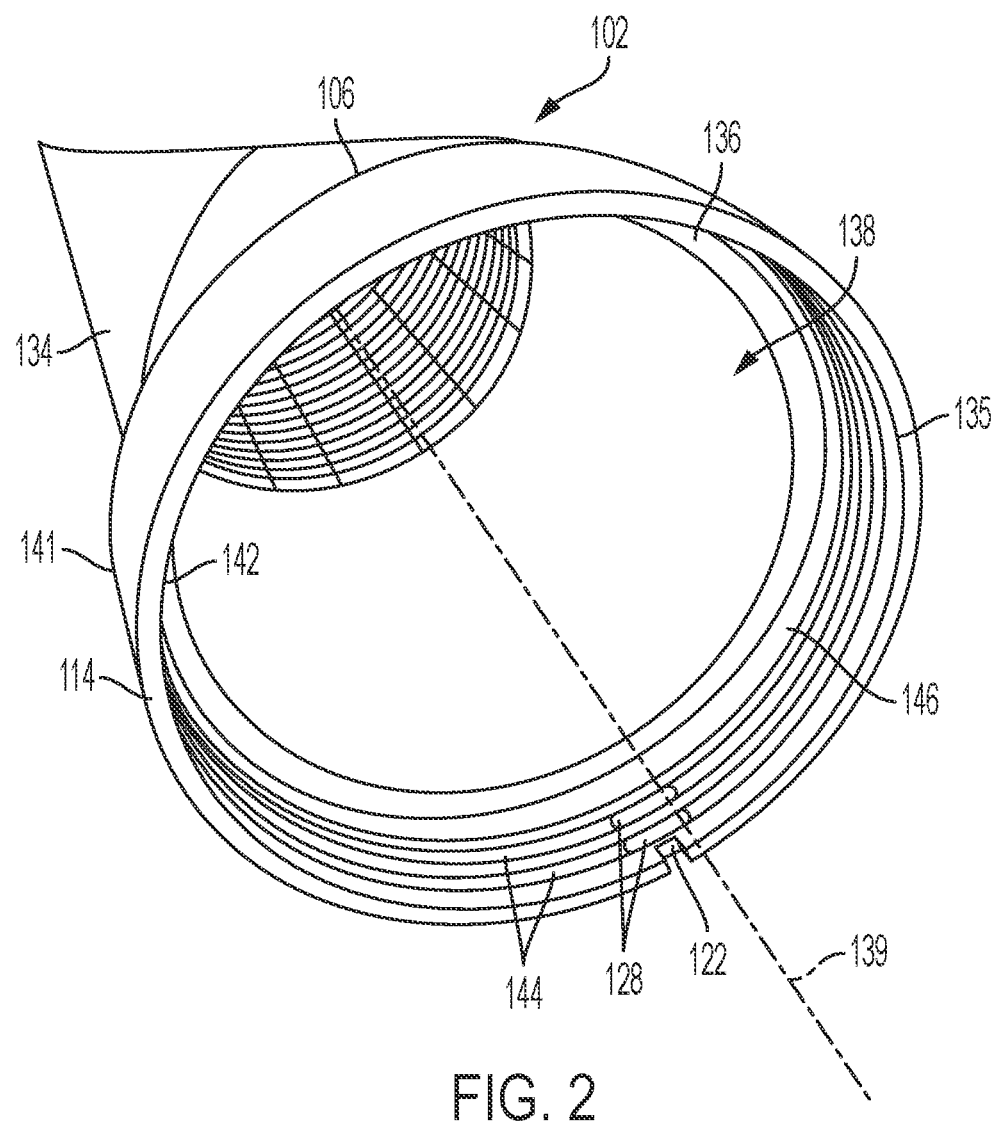
FIG. 2 illustrates a perspective proximal view of a box of the spline joint of FIG. 1 according to an aspect of the present disclosure.

FIG. 2 illustrates a perspective proximal view of the box 102 according to an aspect of the present disclosure. The box 102 is shown connected to a pipe 134 from the distal end 106 of the box 102. The outer diameter of the pipe 134 may be step registered. The step registered outer diameter may allow for an easier alignment and attachment of the box 102 to the pipe 134 by creating a parallel coupling axis. The distal end 106 may have a shoulder 136 extending into a bore 138 of the box 102 toward a central longitudinal axis 139 of the box 102. The shoulder 136 may be arcuate.

A proximal end 140 (see FIG. 4) of the pin 104 may be spaced away from the shoulder 136 when the box 102 and the pin 104 are joined. Preferably, the spacing may be between 1/32 inch (about 0.793 mm) and 5/64 inch (about 1.97 mm). For example, the spacing may be about 1/16 inch (about 1.587 mm). The proximal end 114 of the box 102 may have the key slot 122 extend completely from an outer circumference 141 of the box 102 to an inner circumference 142 of the box 102, being an opening defined through the box 102.

Between the proximal end 114 of the box 102 and the distal end 106 of the box 102, an inner surface 135 of the box 102 may have a plurality of grooves 144, 146. The spline grooves 144 may extend circumferentially along the inner surface 135. The spline grooves 144 may receive the splines 126 (see FIG. 1). The slots 128 may coincide with the spline grooves 144. Two spline grooves 144 are shown in FIG. 2 by example. In other examples, there may be more or less spline grooves 144. The number of spline grooves 144 may depend on the number of splines 126.

The O-ring groove 146 may extend circumferentially along the inner surface 135. The O-ring groove 146 may receive an O-ring 148 (see FIG. 9). The O-ring 148 may create a seal between the box 102 and the pin 104. A single O-ring groove 146 is shown in FIG. 2 by example. In other examples, there may be more O-ring grooves 146. The number of O-ring grooves 146 may depend on the number of O-rings 148. The proximal end 114 of the box 102 may be initially tapered to facilitate the reception of O-rings 148. The O-ring 148 may be installed in groove 146 without stretching or passing through the spline grooves 144. Assembly of the spline joint 100 is achieved without having the O-ring 148 pass through the spline grooves 14 during engagement and may mitigate a risk of damage to the O-ring 148.

Figure 3:
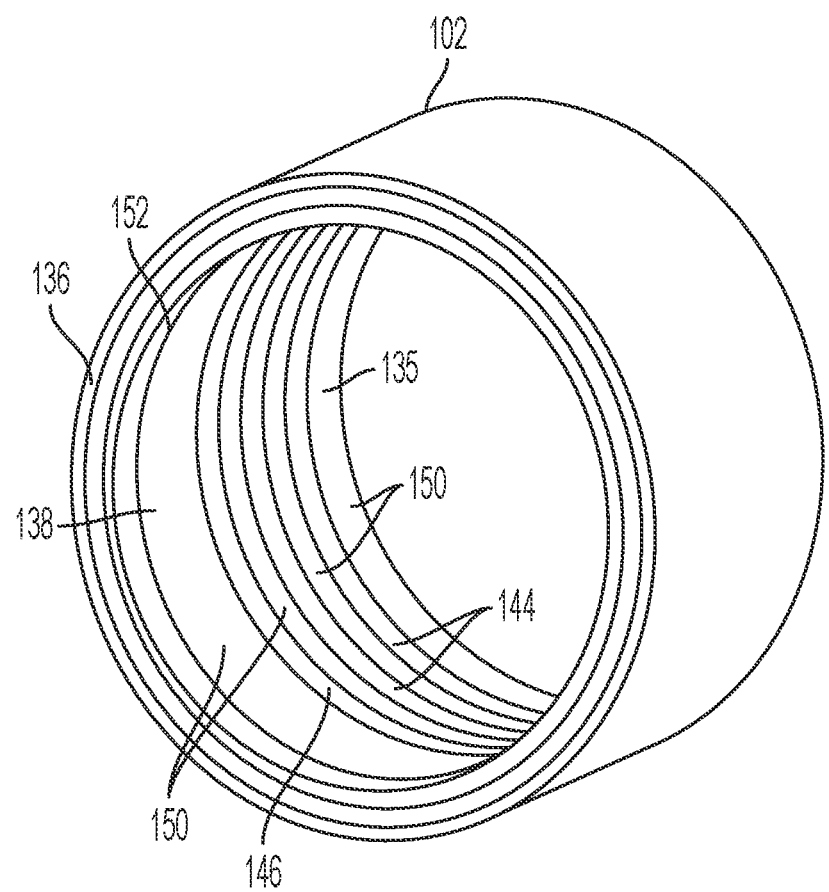
FIG. 3 illustrates a perspective distal view of the box of FIG. 2 according to an aspect of the present disclosure.

FIG. 3 illustrates a perspective distal view of the box 102 according to an aspect of the present disclosure. The box 102 may have a uniform outer diameter equal with pin 104. The uniform outer diameter between box 102 and pin 104 may prevent debris accumulation inside the spline joint 100 (see FIG. 1). The uniform outer diameter may further ensure the box 102 and the pin 104 (see FIG. 4) are properly joined. The bore 138 may have a uniform diameter. The inner surface 135 mates, makes direct contact with, or otherwise receives the pin 104 (see FIG. 4). The uniform diameter of mating surfaces 150 may provide improvement in the consistency of clearances and a known plane of interference between the mating surfaces 150 and the splines 126 (see FIG. 1). The clearances between the mating surfaces 150 and the pin 104 may be controlled to prevent the splines 126 (see FIG. 1) from slipping out of the spline joint 100 (see FIG. 1). The grooves 144, 146 may be between the mating surfaces 150. The shoulder 136 may have beveled edges 152 for a sealing weld between the pipe 134 (see FIG. 2) and the box 102. The shoulder 136 also may have a depressed register step (XYZ) of correct dimension to accept and locate properly the pipe 134 and the box 102 for a structural weld between them. The step register may allow for an easier alignment and attachment of the box 102 to the pipe 134 by creating a parallel coupling axis.

Figure 4:
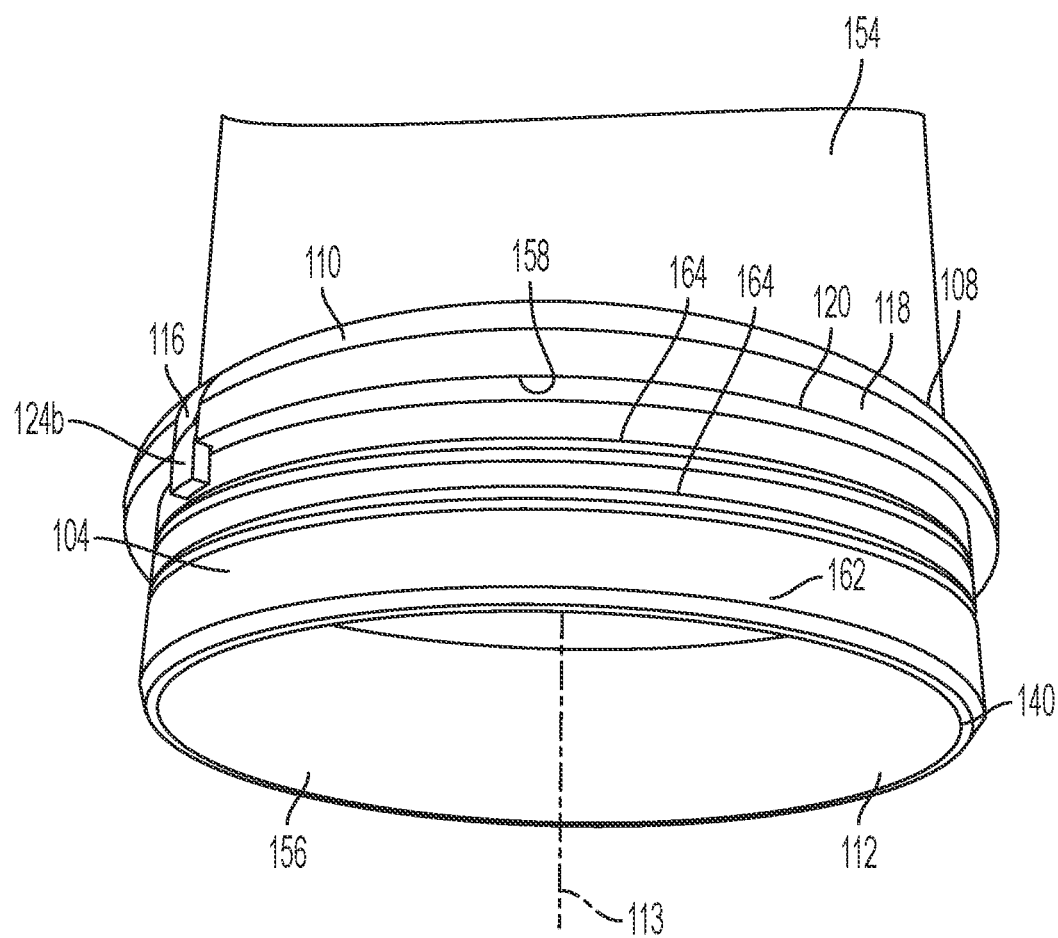
FIG. 4 illustrates a perspective proximal view of a pin of the spline joint of FIG. 1 according to an aspect of the present disclosure.

FIG. 4 illustrates a perspective proximal view of the pin 104 according to an aspect of the present disclosure. The pin 104 is shown connected to a pipe 154 from the distal end 108 of the pin. The outer diameter of the pipe 154 may be properly located by means of a depressed step register on distal end 108 of the pin. The step register may allow for an easier alignment and attachment of the pin 104 to the pipe 154 by creating a parallel coupling axis. The distal end 108 of the pin 104 may have the shoulder 110 extending away from the bore 112 of the pin 104. The shoulder 110 may be circumferential. The proximal end 114 (see FIG. 2) of the box 102 may be biased against the shoulder 110 when the box 102 (see FIG. 2) and the pin 104 are joined. The shoulder 110 may have the key slot 116 extend partially from the outer circumference 118 to the inner circumference 120 of the pin 104. The key slot 116 may completely extend from a proximal end 158 of the shoulder 110 to the distal end 108 of the pin 104. Between the proximal end 140 of the pin 104 and the distal end 108 of the pin, an outer surface 162 of the pin 104 may have a plurality of grooves 164. The grooves 164 may extend circumferentially along the outer surface 162. The grooves 164 may receive the splines 126 (see FIG. 1). Two grooves 164 are shown in FIG. 4 by example. In other examples, there may be more or less grooves 164. The number of grooves 164 may depend on the number of splines 126.

Figure 5:
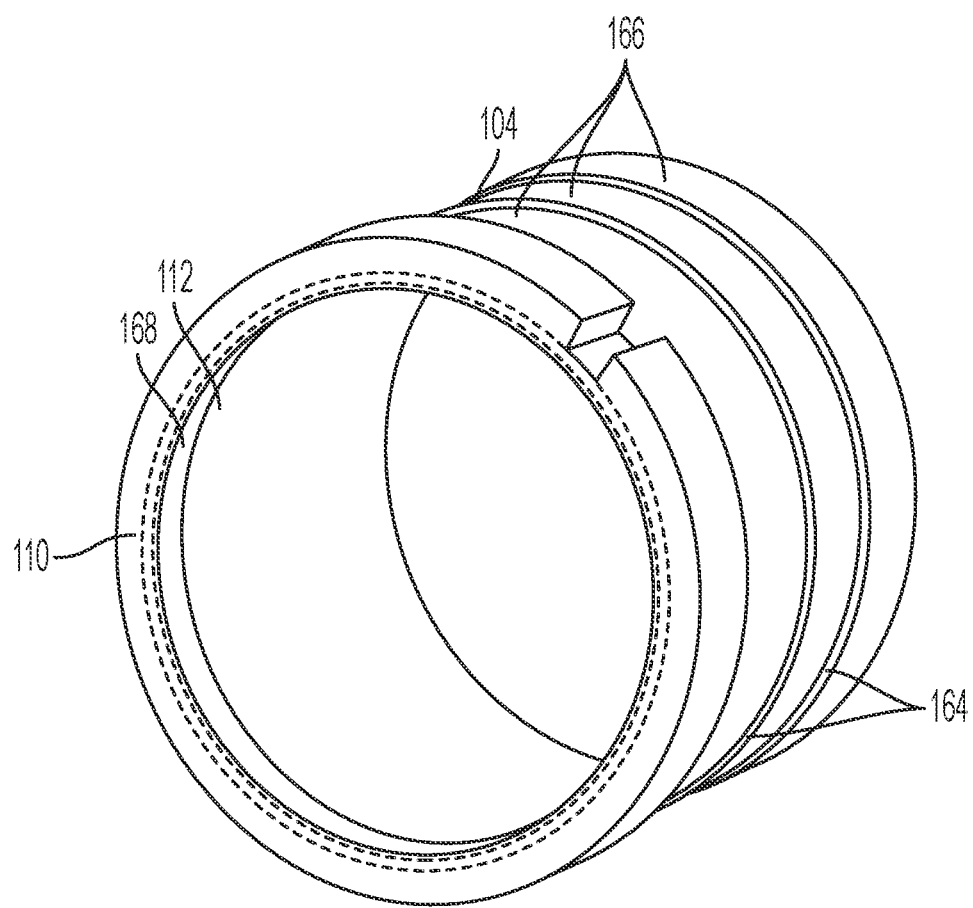
FIG. 5 illustrates a perspective distal view of the pin of FIG. 4 according to an aspect of the present disclosure.

FIG. 5 illustrates a perspective distal view of the pin 104 according to an aspect of the present disclosure. The pin 104 may have a uniform inner diameter. The uniform inner diameter may prevent debris accumulation inside the bore 112. The pin 104 may have a uniform diameter where the pin 104 makes direct contact with the box 102 (see FIG. 3). The uniform diameter of mating surfaces 166 may provide improvement in the consistency of clearances and a known plane of interference between the mating surfaces 166 and the splines 126 (see FIG. 1). The grooves 164 may be between the mating surfaces 166. The shoulder 110 may have beveled edges 168 for a sealing weld between the pipe 154 (see FIG. 4) and the pin 104.

Figure 6:
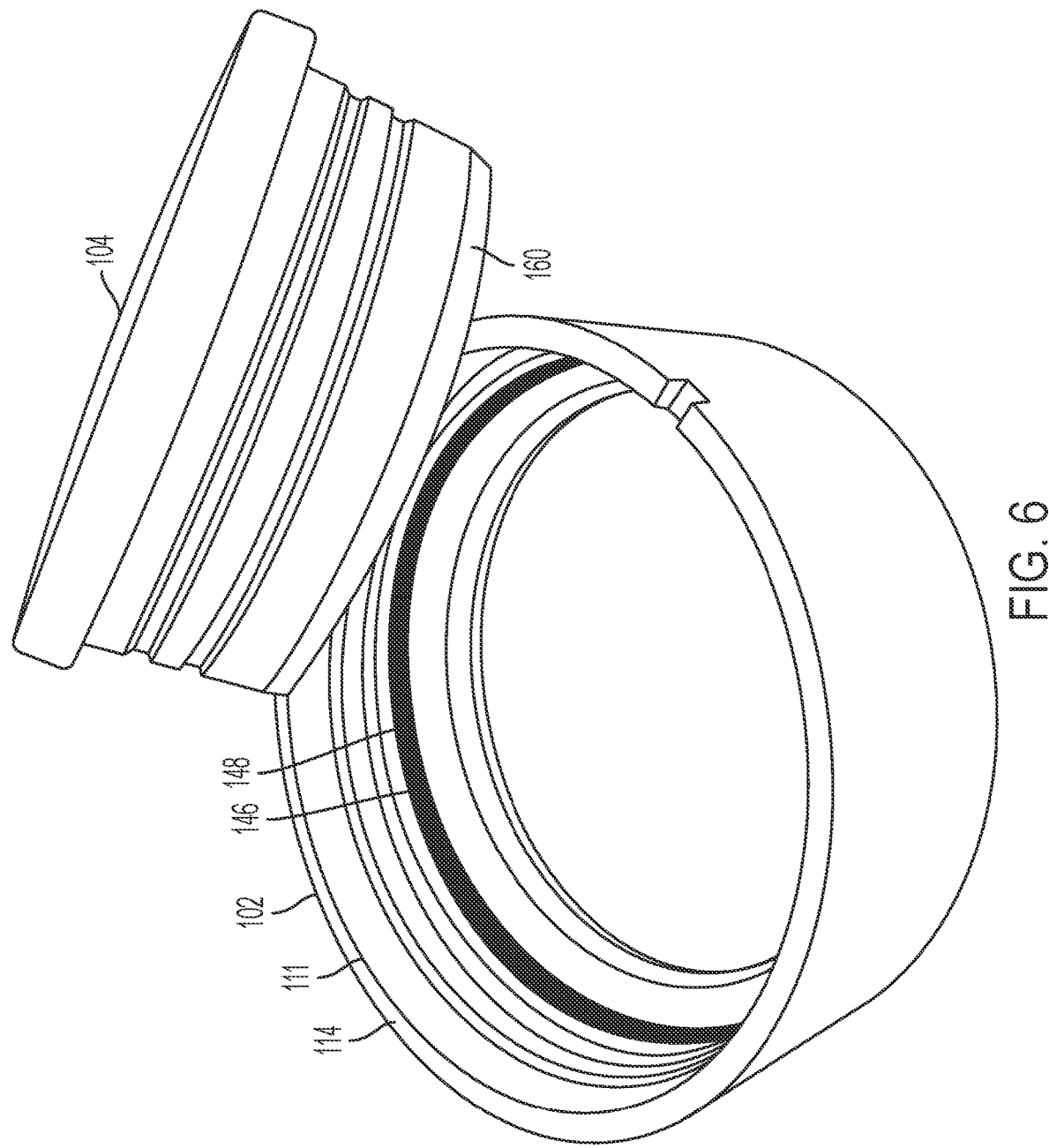
FIG. 6 illustrates a perspective view of the box of FIG. 2 with an O-ring and the pin of FIG. 2 according to an aspect of the present disclosure.

FIG. 6 illustrates a perspective view of the box 102 with an O-ring 148 and the pin 104 according to an aspect of the present disclosure. The O-ring groove 146 may receive the O-ring 148. The O-ring 148 may create a seal between the box 102 and the pin 104. A single O-ring groove 146 is shown in FIG. 6 by example. In other examples, there may be more O-ring grooves 146. The number of O-ring grooves 146 may depend on the number of O-rings 148. The proximal end 114 of the box 102 may be initially tapered to facilitate the reception of O-rings 148. The proximal end 160 of the pin 104 may also be initially tapered in the reverse direction of the taper of the box 102 to facilitate the reception of the O-rings 148. The taper may prevent damage to the O-rings 148 and unseating of the O-rings 148 from the O-ring grooves 146. The location of O-ring grooves 146 may avoid the spline grooves 164 of FIG. 4 from passing through the O-ring 148 during engagement of the pin 104 with the box 102, thus limiting or preventing O-ring 148 damage.

Figure 7:
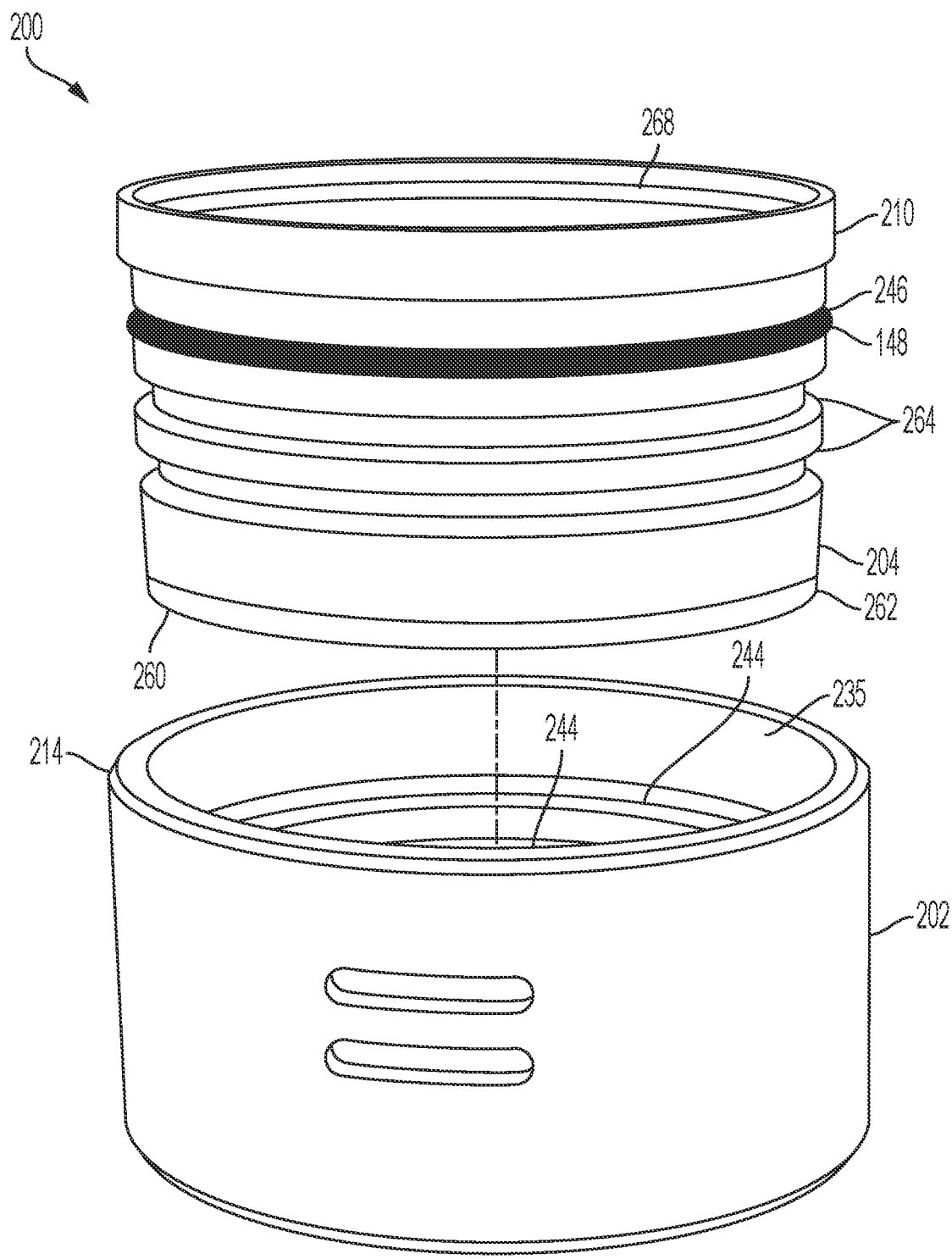
FIG. 7 illustrates an exploded view of a box and a pin of a spline joint according to an aspect of the present disclosure.

FIG. 7 illustrates an exploded view of a box 202 and a pin 204 of a spline joint 200 according to an aspect of the present disclosure. The spline joint 200 may have the same specifications and applications of the spline joint 100 of FIG. 1, except the pin 204 may have a groove 246 that receives an O-ring 148, additional to the O-ring groove 146 in FIG. 2, of the box 202. The groove 246 may extend circumferentially along an outer surface 262. The O-ring 148 may create a seal between the pin 204 and the inner surface 235 of the box 202. A single groove 246 is shown in FIG. 6 by example. In other examples, there may be more grooves 246. The number of grooves 246 may depend on the number of O-rings 148. The proximal end 260 of the pin 204 may be tapered to facilitate the reception of O-rings 148. The proximal end 214 of the box 202 may also be tapered in the reverse direction of the taper of the pin 204 to facilitate the reception of the O-rings 148. The shoulder 210 of the pin 204 may have depressed step register edges 268 for a proper sitting between a pipe and the pin 204 and proper welding of the two. The splines 126 (see FIGS. 1, 8) may be inserted between the grooves 264 of the pin 204 and the grooves 244 of the box 202.

Figure 8:
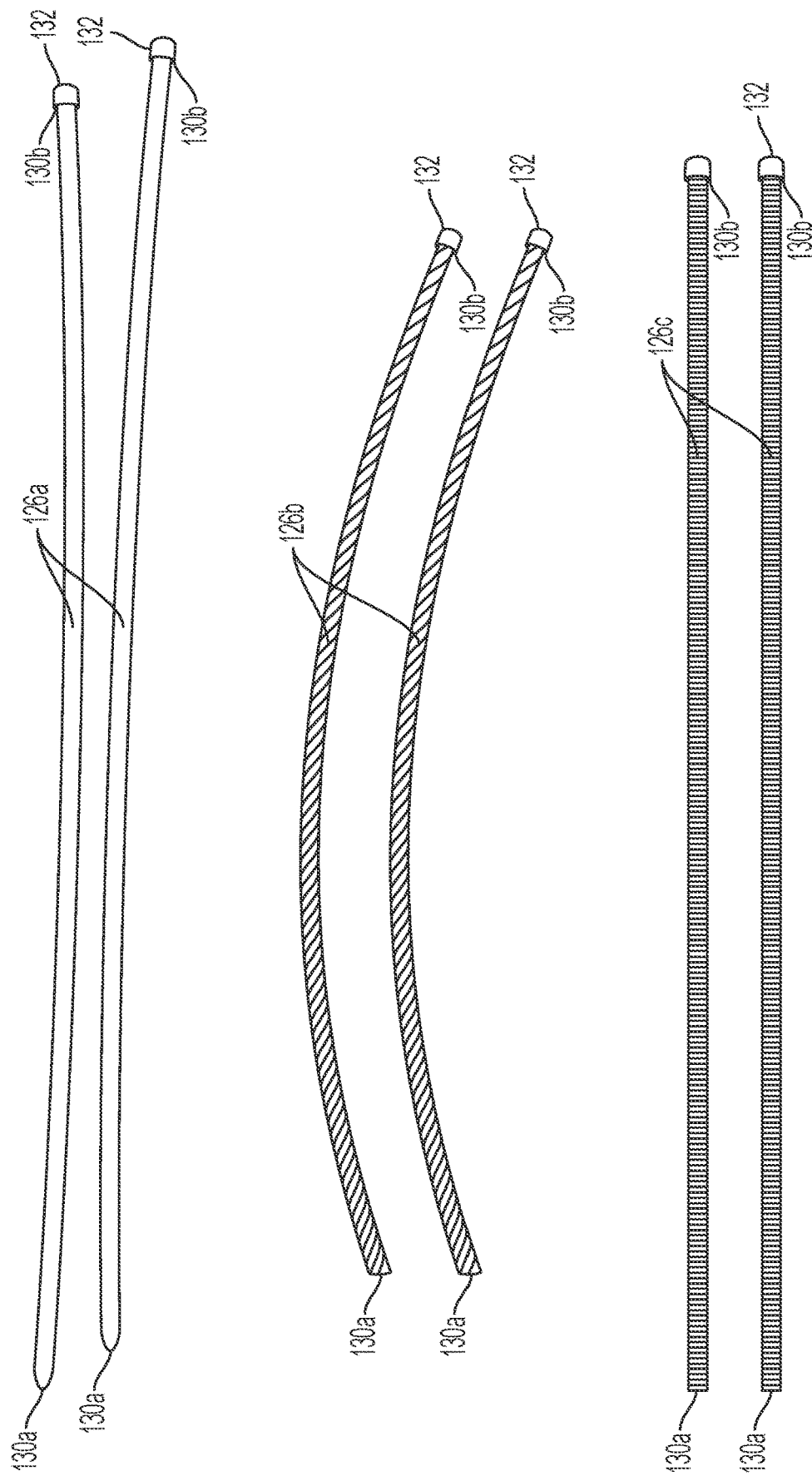
FIG. 8 illustrates a plurality of splines according to an aspect of the present disclosure.

FIG. 8 illustrates a plurality of splines 126ac according to an aspect of the present disclosure. The splines 126a-c may be made from a different material and have different load ratings based on the application. The load ratings may vary by the diameter of the splines 126a-c. The splines 126a-c may have different dimensions. The splines 126a-c may have different lifespans before requiring a replacement or may be permanent. Ends 130a or ends 130b of the splines 126a-c may have a cover 132. The cover 132 may be plastic or metal. The cover 132 may prevent one from getting poked or scratched by the ends 130a or 130b. In FIG. 8, spline ends 130b have the cover 132 by example.

The spline 126a may be plastic. For example, the spline 126a may be made from Delrin or polyoxymethylene plastic. The plastic composition of the spline 126a may resist significant physical, chemical, or biological transformation or affect other matter with which it comes into contact due to its inert nature. The spline 126a may be used in pump columns, well casings, and well screens by example. The spline 126a may have a load rating between 42,500 pounds (lbs) (about 19277.7 kg) to 90,000 lbs (about 40823.3 kg) when used in well casings and well screens. The spline 126a may have a load rating between 32,500 lbs (about 14741.8 kg) to 90,000 lbs (about 40823.3 kg) when used in pump columns with a discharge pressure rated to 300 pound-force per square inch (psi) (about 2068.5 kPa). The spline 126a may be replaced periodically to maintain the working condition of the spline joint 100 (see FIG. 1). Preferably, the spline 126a may have a diameter between 0.2 inch (about 5.08 mm) to 0.4 in (about 10.16 mm). Most preferably, the spline 126a may have a diameter between 0.250 in (about 6.35 mm) to 0.375 in (about 10.16 mm). For example, the diameter may be 0.312 in (about 7.92 mm).

The spline 126b may be metal. For example, the spline 126b may be made from carbon steel or SST 302/316. Metal fibers may be wound to form a cable structure. The cable structure of the spline 126b may allow the spline 126b to have a relatively smaller diameter than the splines 126a-c. The spline 126b may be used in pump columns, well casings, and well screens by example. The spline 126b may have a load rating between 100,000 lbs (about 4535.9 kg) to 112,500 lbs (about 51029.1 kg) when used in well casings and well screens. The spline 126b may have a load rating between 35,000 lbs (about 15875.7 kg) to 112,500 lbs (about 51029.1 kg) when used in pump columns with a discharge pressure rated to 300 psi (about 2068.5 kPa). The spline 126b may be replaced periodically. Preferably, the spline 126a may have a diameter between 0.2 inch (about 5.08 mm) to 0.4 in (about 10.16 mm). Most preferably, the spline 126a may have a diameter between 0.250 in (about 6.35 mm) to 0.375 in (about 10.16 mm). For example, the diameter may be 0.250 in (about 6.35 mm) or 0.312 in (about 7.92 mm).

The spline 126a may be a spring. The spring may be coiled at various angles (e.g., 30 degrees, 45 degrees, 60 degrees, etc.). The spring may have canted coils. The spring may be metal. For example, the spring may be made from SST 302/316. The composition and structure of the spline 126c may advantageously provide added strength. The spline 126c may be used in pump columns, well casings, and well screens by example. The spline 126c may have a load rating between 150,000 lbs (about 68038.9 kg) to 175,000 lbs (about 79378.7 kg) when used in well casings and well screens. The spline 126c may have a load rating between 100,000 lbs (about 45359.2 kg) to 150,000 lbs (about 68038.9 kg) when used in pump columns with a discharge pressure rated to 300 psi (about 2068.5 kPa). The spline 126c may be permanent or replaced periodically. Preferably, the spline 126a may have a diameter between 0.2 inch (about 5.08 mm) to 0.4 in (about 10.16 mm). Most preferably, the spline 126a may have a diameter between 0.250 in (about 6.35 mm) to 0.375 in (about 10.16 mm). For example, the diameter may be 0.312 in (about 7.92 mm).

Figure 9:
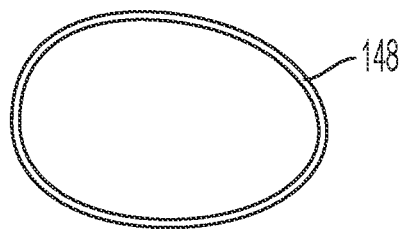
FIG. 9 illustrates an O-ring of the spline joint of FIG. 1 according to an aspect of the present disclosure.

FIG. 9 illustrates an O-ring 148 according to an aspect of the present disclosure. The O-ring 148 may create a seal between the box 102 (see FIG. 2) and the pin 104 (see FIG. 4). The O-ring 148 may be made from Neoprene or Buna-N rubbers (NBR) or any other approved rubber compound. A single O-ring 148 is shown in FIG. 9 by example. The internal pressure within the spline joint 100 (see FIG. 1) may be increased by adding more O-rings 148. In some embodiments, designing the grooves 146, 246 (see FIGS. 2, 7) receiving the O-ring 148 such that the O-ring 148 is further compressed may increase the internal pressure. In other embodiments, the cross-sectional area of the O-ring 148 may be increased or changed such that the O-ring 148 is further compressed may increase the internal pressure. The O-ring 148 may achieve twenty percent (20%) compression at a minimum. In well casing and well screen applications, the spline joint 100 may have a single O-ring 148. In pump column applications, the spline joint 100 may have two or more O-rings 148 on both the box 102 and the pin 104. The O-ring or O-rings 148 may be replaced periodically to maintain the working condition of the spline joint 100.

Figure 10:
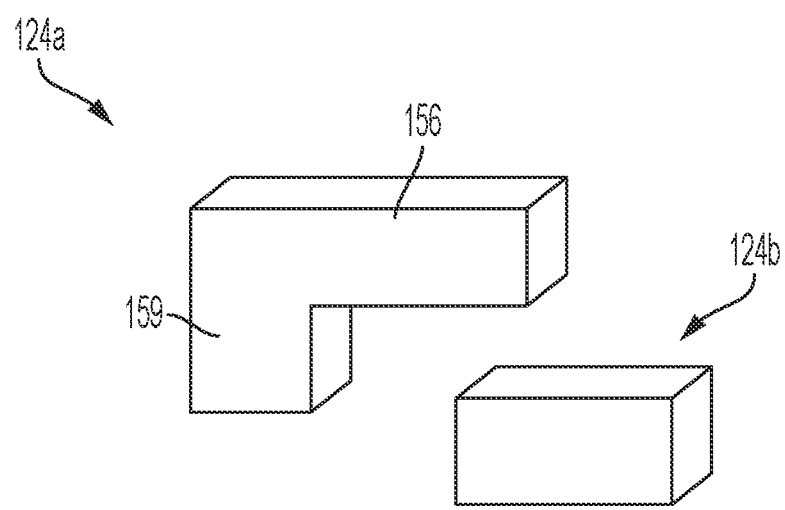
FIG. 10 illustrates a plurality of keys of the spline joint of FIG. 1 according to an aspect of the present disclosure.

FIG. 10 illustrates keys 124a,b of the spline joint 100 (see FIG. 1) according to an aspect of the present disclosure. The keys 124a,b may prevent the rotation of the box 102 (see FIG. 2) and the pin 104 (see FIG. 4) relative to each other. The keys 124a,b may prevent the rotation of the box 102 and the pin 104, and thus the joined parts (e.g., pipes, screens, etc.), by allowing the connection to withstand applied torques or rotational forces. Such forces may be especially common in pump column applications. The torque allowances may be altered by adding more keys 124b or changing the cross-sectional area of the key 124b. The keys 124a,b are made from metal or plastic. A metal key 124 is shown in FIG. 10 by example. In some embodiments, the keys may be a unitary construction, such as the keys 124a,b of FIG. 10. In some embodiments, the keys 124a,b may be installed by fastening the multiple parts with conventional fastening techniques (e.g., adhesion, fitted joints, etc.) or welding. The key 124a may have an L-shape. A leg 156 and a base 159 of the key 124a may form the L-shape. The key 124a may be installed onto the pin 104 shoulder 110 in the absence of slots 116. When the key 124b is installed into the slots 116, and inserted into slot 122, the key 124b may be completely or partially inside the slots 116, 122, and the base 159 may extend into the bore 138 (see FIG. 2) of the box 102.

Figure 11:
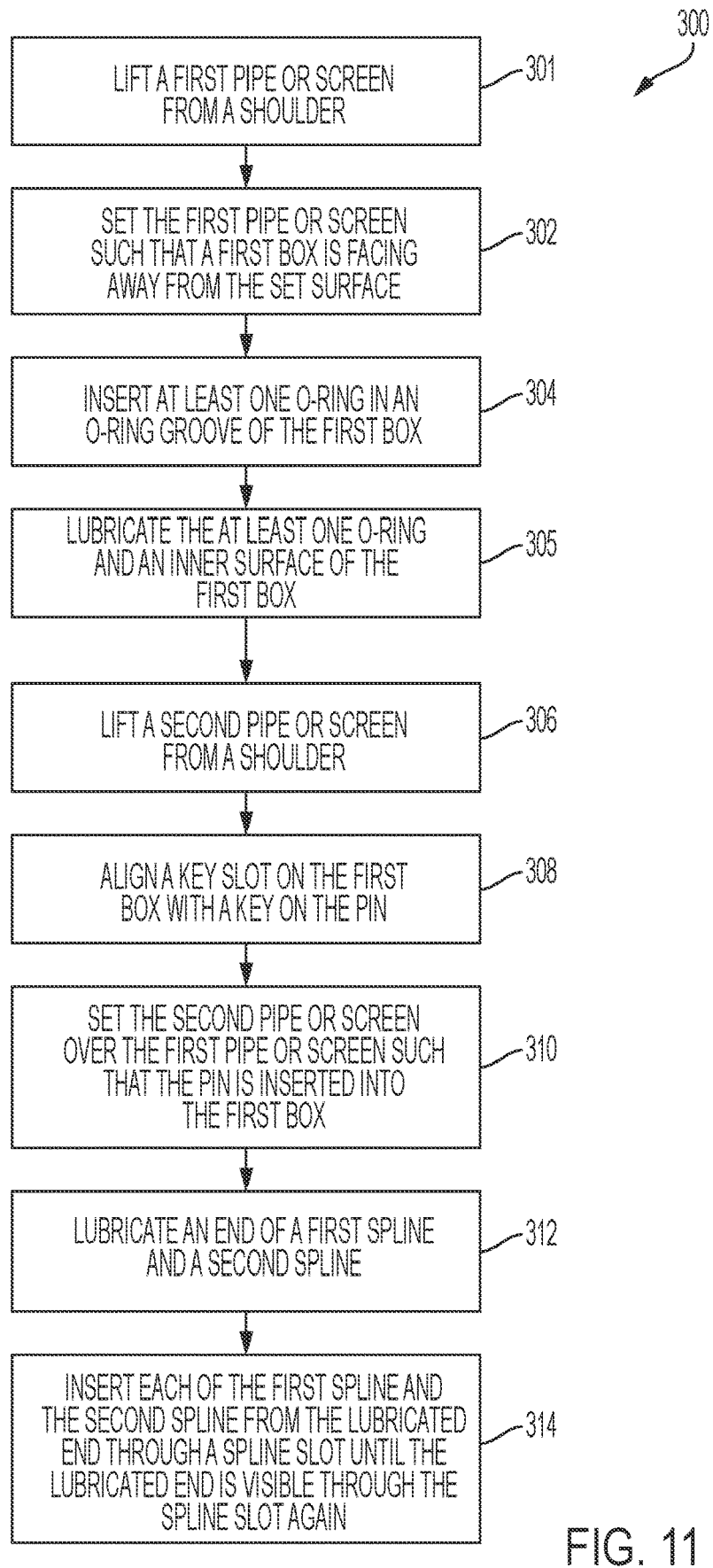
FIG. 11 is a flow diagram of a method for installing a spline joint according to an aspect of the present disclosure.

FIG. 11 is a flow diagram of a method 300 for installing a spline joint 100 (see FIG. 1) according to an aspect of the present disclosure. The method may begin with block 301. In some embodiments, prior to the step of block 301, any dirt and debris from the box 102 (see FIG. 1) and the pin 104 (see FIG. 1) may be cleaned. The box 102 and the pin 104 may be inspected for bumps, dings, abrasions, or any other damage. Any such finding may be filed and smoothened when necessary.

In block 301, the method may include lifting a first pipe or screen from a shoulder of the box 102. Elevators may be used to lift the first pipe or screen. In block 302, the method may include setting the first pipe or screen on a surface such that a first box 102 (see FIG. 2) is facing away from the surface. The surface may be a rig's table. In block 304, the method may include inserting at least one O-ring 148 (see FIGS. 6-7) in an O-ring groove 146 (see FIG. 2) of the first box 102. Once inserted, the at least one O-ring 148 and the inner surface 135 (see FIG. 2) may be lubricated with a pipe joint lubricant in block 305. In some embodiments, the spline grooves 144 (see FIG. 2) may also be lubricated with a pipe joint lubricant.

In block 306, the method may include lifting a second pipe or screen from a shoulder. Elevators may be used to lift the second pipe or screen. The shoulder may be the shoulder of a second box attached to the second pipe or screen. The pin 104 (see FIG. 4) of the second pipe or screen may be brought next to the first box 102.

In block 308, the method may include aligning a key installed in the key slot 116 (see FIG. 1) of the pin 104 with slot 122 (see FIG. 1) on the first box 102. In block 310, the method may include setting the second pipe or screen over the first pipe or screen such that the pin 104 is inserted into the first box 102. The key 124 may then be engaged with the key slots 116, 122.

In block 312, the method may include lubricating ends 130a (see FIG. 1) of a first spline 126 and a second spline 126 (see FIG. 1). The lubricant may be a pipe joint lubricant. In block 314, the method may conclude by inserting the first spline 126 from the lubricated end 130a through a first slot 128 until the lubricated end 130a is visible through the first slot 128 again and inserting the second spline 126 from the lubricated end 130a through a second slot 128 until the lubricated end 130a is visible through the second slot 128 again. A cover may be placed over the protruding ends 130a and/or the end 130b (see FIG. 1) and the slots 128. The cover may be duct tape, rubber strips fastened around box 102, manufactured cover, etc.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A spline joint to be used in a system having a casing or a screen comprising:
a box having a hollow cylindrical body, the hollow cylindrical body having an inner surface and a distal end, the distal end having an arcuate shoulder extending into a bore defined by the hollow cylindrical body toward a central longitudinal axis of the hollow cylindrical body of the box, the inner surface having a plurality of grooves defined into the inner surface of the hollow cylindrical body and a plurality of slots defining apertures through the hollow cylindrical body from the inner surface;
a pin configured to be received by the box, the pin having a hollow cylindrical body, the hollow cylindrical body of the pin having an outer surface and a distal end, the distal end having an arcuate shoulder extending outward of the outer surface in a direction away from a central longitudinal axis of the hollow cylindrical body of the pin, the outer surface having a plurality of grooves and a slot;
a plurality of splines configured to be received by a first set of grooves of the plurality of grooves of the box and the plurality of grooves of the pin, the plurality of splines insertable between the first set of grooves of the box and the first set of grooves of the pin through a first set of slots of the plurality of slots of the box to join the box and the pin; and a key configured to be received by a second slot of the plurality of slots of the box and attached to the shoulder or a slot of the pin to prevent rotation of the pin and the box relative to each other.

2. The spline joint of claim 1, further comprising at least one O-ring configured to be received by a second set of grooves of the plurality of grooves of the box to create a seal between the box and the pin, wherein a proximal end of the box and a proximal end of the pin are initially tapered to facilitate reception of the at least one O-ring.

3. The spline joint of claim 1, wherein the body of the box and the body of the pin each have a uniform outer diameter to prevent debris accumulation inside the spline joint and ensure proper joining of the box and the pin.

4. The spline joint of claim 1, wherein the inner surface of the box and an inner surface of the pin each have a bevel for a sealing weld.

5. The spline joint of claim 1, wherein mating surfaces of the box have a uniform first diameter and mating surfaces of the pin have a uniform second diameter.

6. The spline joint of claim 1, wherein a proximal end of the pin is spaced apart from the shoulder of the box when the box and the pin are joined in order to ensure their correct and proper field assembly in the event any debris might have fallen inside the box during field handling that otherwise might interfere during assembly.

7. The spline joint of claim 1, wherein a proximal end of the box and the shoulder of the pin make direct contact with each other when the box and the pin are joined.

8. The spline joint of claim 1, wherein the key extends into a bore of the pin when the box and the pin are joined.

9. The spline joint of claim 1, wherein the plurality of splines are plastic rods, metal cables, or springs.

10. A spline joint configured to be used in a system having a column pump comprising:

a box having a hollow cylindrical body, the hollow cylindrical body having an inner surface and a distal end, the distal end having an arcuate shoulder extending into a bore defined by the hollow cylindrical body toward a central longitudinal axis of the hollow cylindrical body of the box, the inner surface having a plurality of grooves defined into the inner surface of the hollow cylindrical body and a plurality of slots;

a pin configured to be received by the box, the pin having a hollow cylindrical body, the hollow cylindrical body of the box having an outer surface and a distal end, the distal end having an arcuate shoulder extending outward of the outer surface in a direction away from a central longitudinal axis of the hollow cylindrical body of the pin, the outer surface having a plurality of grooves;

a plurality of splines configured to be received by a first set of grooves of the plurality of grooves of the box and a first set of grooves of the plurality of grooves of the pin, the plurality of splines insertable between the first set of grooves of the box and the first set of grooves of the pin through a first set of slots of the plurality of slots of the box to join the box and the pin; and a key configured to be received by a second slot of the plurality of slots of the box and attached to a slot of the pin to prevent rotation of the pin and the box relative to each other.

11. The spline joint of claim 10, further comprising a plurality of O-rings configured to be received by a second set of grooves of the plurality of grooves of the box and the pin to create a seal between the box and the pin, wherein a proximal end of the box and a proximal end of the pin are initially tapered to facilitate reception of the plurality of O-rings.

12. The spline joint of claim 10 wherein the body of the box and the body of the pin each have a uniform outer diameter to prevent debris accumulation inside the spline joint and ensure proper joining of the box and the pin.

13. The spline joint of claim 10 wherein the inner surface of the box and an inner surface of the pin each have a bevel for a sealing weld.

14. The spline joint of claim 10 wherein mating surfaces of the box have a uniform first diameter and mating surfaces of the pin have a uniform second diameter.

15. The spline joint of claim 10 wherein a proximal end of the pin is spaced apart from the shoulder of the box when the box and the pin are joined in order to ensure their correct and proper field assembly in the event any debris might have fallen inside the box during field handling that otherwise might interfere during assembly.

16. The spline joint of claim 10 wherein a proximal end of the box and the shoulder of the pin make direct contact with each other when the box and the pin are joined.

17. The spline joint of claim 10 wherein the plurality of splines are plastic rods, metal cables, or springs.

18. A method for installing a spline joint comprising:

lifting a first pipe or screen from a shoulder formed at a joint between the first pipe or screen and a first box attached to an end of the first pipe or screen;

setting the first pipe or screen on a surface such that the first box is facing away from the surface;

lifting a second pipe or screen from a shoulder formed at a joint between the second pipe or screen and a second box attached to a first end of the second pipe or screen;

aligning a key slot on the first box with a key installed on a shoulder of the pin attached to a second end of the second pipe or screen;

setting the second pipe or screen over the first pipe or screen such that the pin is inserted into the first box;

lubricating an end of a first spline and a second spline; and inserting each of the first spline and the second spline from the lubricated end through a spline slot until the lubricated end is visible through the spline slot again.

19. The method of claim 18 wherein the first spline and the second spline are plastic rods, metal cables, or springs.

20. A spline joint to be used in a system having a casing or a screen comprising:

a box having a hollow cylindrical body, the hollow cylindrical body having an inner surface and a distal end, the distal end having an arcuate shoulder extending into a bore defined by the hollow cylindrical body toward a central longitudinal axis of the hollow cylindrical body of the box, the inner surface having a plurality of grooves defined into the inner surface of the hollow cylindrical body, a plurality of spline-receiving slots defining apertures through the hollow cylindrical body from the inner surface, and a first key-receiving slot defining a first key-receiving aperture through the hollow cylindrical body from the inner surface to the outer surface along a first direction;

a pin configured to be received by the box, the pin having a hollow cylindrical body, the hollow cylindrical body of the pin having an outer surface and a distal end, the distal end having an arcuate shoulder extending outward of the outer surface in a direction away from a central longitudinal axis of the hollow cylindrical body of the pin, the outer surface having a plurality of grooves and a second key receiving slot defining a second key-receiving aperture along a second direction perpendicular to the first direction;

a plurality of splines configured to be received by a first set of grooves of the plurality of grooves of the box and the plurality of grooves of the pin, the plurality of splines insertable between the first set of grooves of the box and the first set of grooves of the pin through a first set of slots of the plurality of slots of the box to join the box and the pin; and a key that is L-shaped and that is configured to be received by a first key-receiving slot the plurality of slots of the box and attached to the second key-receiving slot of the pin to prevent rotation of the pin and the box relative to each other.

\* \* \* \* \*